United States Patent
Koyama (10) Patent No.: US 9,127,810 B2
(45) Date of Patent: Sep. 8, 2015

(54) INJECTION MOLDING MACHINE WITH MOTOR POWER INTERRUPTION FUNCTION

(71) Applicant: FANUC Corporation, Yamanashi (JP)

(72) Inventor: Hideki Koyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 307 days.

(21) Appl. No.: 13/890,615

(22) Filed: May 9, 2013

(65) Prior Publication Data

US 2014/0021805 A1    Jan. 23, 2014

(30) Foreign Application Priority Data

Jul. 23, 2012 (JP) ................. 2012-163019

(51) Int. Cl.
*F16P 3/00* (2006.01)
*B29C 45/84* (2006.01)
*B29C 45/76* (2006.01)

(52) U.S. Cl.
CPC ............. *F16P 3/005* (2013.01); *B29C 45/7666* (2013.01); *B29C 45/84* (2013.01); *B29C 2945/76163* (2013.01); *B29C 2945/76341* (2013.01); *B29C 2945/76387* (2013.01); *B29C 2945/76518* (2013.01); *B29C 2945/76709* (2013.01); *B29C 2945/76866* (2013.01)

(58) Field of Classification Search
CPC ...... F16P 3/005; B29C 45/7666; B29C 45/84
USPC ......................................................... 307/328
See application file for complete search history.

(56) References Cited

U.S. PATENT DOCUMENTS

| 2003/0003177 | A1 | 1/2003 | Miyahara et al. |
| 2005/0122078 | A1 | 6/2005 | Hashimoto et al. |
| 2010/0287841 | A1* | 11/2010 | Ono et al. ........................ 49/349 |
| 2013/0095200 | A1* | 4/2013 | Maruyama et al. ........... 425/171 |

FOREIGN PATENT DOCUMENTS

| JP | 60262617 A | 12/1985 |
| JP | 200037758 A | 2/2000 |
| JP | 2002358106 A | 12/2002 |
| JP | 2002361703 A | 12/2002 |
| JP | 2005165755 A | 6/2005 |
| JP | 2005227873 A | 8/2005 |

OTHER PUBLICATIONS

Decision to Grant a Patent mailed Oct. 8, 2013, corresponds to Japanese patent application No. 2012-163019.

* cited by examiner

*Primary Examiner* — Jared Fureman
*Assistant Examiner* — Joel Barnett
(74) *Attorney, Agent, or Firm* — Lowe Hauptman & Ham, LLP (57) ABSTRACT

An injection molding machine has a motor power interruption function such that it is determined whether or not the respective contents of preset first and second interruption criterion settings are different from each other. If the contents of the two settings are determined to be different from each other, then a third motor power interrupt signal is output so that at least one of first and second motor power interruption units is cut off in response to the output signal, thereby interrupting power supply to a motor.

3 Claims, 6 Drawing Sheets

INJECTION MOLDING MACHINE WITH MOTOR POWER INTERRUPTION FUNCTION

RELATED APPLICATIONS

The present application is based on, and claims priority from, Japanese Application Number 2012-163019, filed Jul. 23, 2012, the disclosure of which is hereby incorporated by reference herein in its entirety.

BACKGROUND OF THE INVENTION

1. Field of the Invention

The present invention relates to an injection molding machine in which software is used to determine interruption of power supply to a motor when a safety door is opened.

2. Description of the Related Art

A molding cycle of an injection molding machine comprises a process for closing a mold, process for injecting a molten resin into the mold, process for melting and metering the resin for the next molding cycle, process for opening the mold, and process for ejecting a molded product from the mold. In the process for closing the mold (consisting of movable and stationary mold halves), among these various processes, the mold is rapidly closed under high thrust. Therefore, it is very dangerous if the whole or part of an operator's body gets in between the movable and stationary mold halves while the mold is being closed.

To overcome this, a moving part of the injection molding machine is provided with a safety door for ensuring the safety of the operator who operates the machine. Further, Japanese Patent Application Laid-Open No. 60-262617 discloses a system for ensuring an operator's safety, in which a servomotor is safely stopped by outputting a motor stop signal or motor power interrupt signal to a servo amplifier for driving the servomotor when the safety door is opened.

Moreover, a fail-safe method for improved safety is known as a means for ensuring an operator's safety during a risky process of operation, such as mold opening/closing operation. More specifically, a series of power interruption circuits configured to output motor power interrupt signals to a servomotor is provided in two independent systems. Thus, if any interruption circuit in one of the systems goes wrong, its safety can be ensured by interruption operation of an interruption circuit in the other system. Further, Japanese Patent Application Laid-Open No. 2005-165755 discloses low-cost, high-reliability power interruption circuits of this type configured to mutually monitor their respective operating states.

To ensure the safety of the injection molding machine, power supply to a motor should preferably be interrupted when the safety door is open. In contrast, Japanese Patent Application Laid-Open No. 2002-361703 discloses an injection molding machine which is configured not to interrupt power supply to a motor (to establish a semi-automatic override mode) event when a safety door is open, for convenience, on the condition that 'additional safety measures' are taken against some operations, e.g., mold opening operation, molded-product ejecting operation, etc.

Such 'additional safety measures' include use of two-hand push buttons and a mechanical safety device for prohibiting mold closing operation, for example. When changing a motor power interruption criterion for determining whether or not to interrupt power supply to the motor when the safety door is opened, depending on the presence or absence of the additional safety measures, a power interruption determining circuit formed of a relay and the like should only be replaced according to presence or absence of the safety measure. However, the replacement of such an electrical circuit is not easy, and a plurality of electrical circuits must be provided in advance, depending on the type of the "additional safety measures".

If the motor power interruption circuit is formed of software in place of the electrical circuit, on the other hand, it can provide a low-cost advantage. In case where two motor power interruption criteria are included in the same software and either one of the two is used by switching over, however, the reliability of a switching unit must be enhanced not to make start operating with an unintended motor power interruption criterion due to erroneous setting or operation.

SUMMARY OF THE INVENTION

Accordingly, in view of the problems of the prior art described above, the object of the present invention is to provide a low-cost, high-reliability injection molding machine, configured to prevent erroneous setting or operation in the case where two or more motor power interruption criteria are included in a motor power interruption circuit formed of software and either one of them is used by switching them over.

An injection molding machine with motor power interruption function according to the present invention has at least two motor power interruption units which drive a moving part of the injection molding machine by means of a motor and are configured to switch between power supply to the motor and interruption of power supply to the motor according to an open/close state of a safety door. The injection molding machine comprises: a first safety-door state detection unit configured to detect the open/close state of the safety door; a first determination unit configured to determine whether or not to interrupt power supply to the motor, based on a first safety-door state signal output from the first safety-door state detection unit, an operating state of the injection molding machine, and a first interruption criterion setting (first parameter) previously set in the injection molding machine, and to output a first motor power interrupt signal; a first motor power interruption unit configured to interrupt power supply to the motor in response to the first motor power interrupt signal output from the first determination unit; a second safety-door state detection unit configured to detect the open/close state of the safety door; a second determination unit configured to determine whether or not to interrupt power supply to the motor, based on a second safety-door state signal output from the second safety-door state detection unit, the operating state of the injection molding machine, and a second interruption criterion setting (second parameter) previously set in the injection molding machine, and to output a second motor power interrupt signal; a second motor power interruption unit connected in series with the first motor power interruption unit and configured to interrupt power supply to the motor in response to the second motor power interrupt signal output from the second determination unit; and a third determination unit configured to determine whether or not the respective contents of the first and second interruption criterion settings (first and second parameters) are different from each other and output a third motor power interrupt signal if the contents of the two settings are different. One of the at least two motor power interruption units is interrupted by the third motor power interrupt signal output by the third determination unit, thereby interrupting power supply to the motor.

The injection molding machine may further comprise a third motor power interruption unit connected in series with the first and second motor power interruption units, wherein power supply to the motor is interrupted by applying the third motor power interrupt signal output by the third determination unit to the third motor power interruption unit.

The injection molding machine may further comprise a third motor power interruption unit connected in series with the first and second motor power interruption units, wherein power supply to the motor is interrupted by applying at least one of the first and second motor power interrupt signals to the third motor power interruption unit, regardless of determination results of the first and second determination units regarding power supply to the motor.

According to the present invention, there may be provided a low-cost, high-reliability injection molding machine, configured to prevent erroneous setting or operation in the case where two or more motor power interruption criteria are included in a motor power interruption circuit formed of software and either one of them is used by switching them over.

BRIEF DESCRIPTION OF THE DRAWINGS

The above and other objects and features of the present invention will be obvious from the ensuing description of embodiments with reference to the accompanying drawings, in which.

DESCRIPTION OF THE PREFERRED EMBODIMENTS

Figure 1:
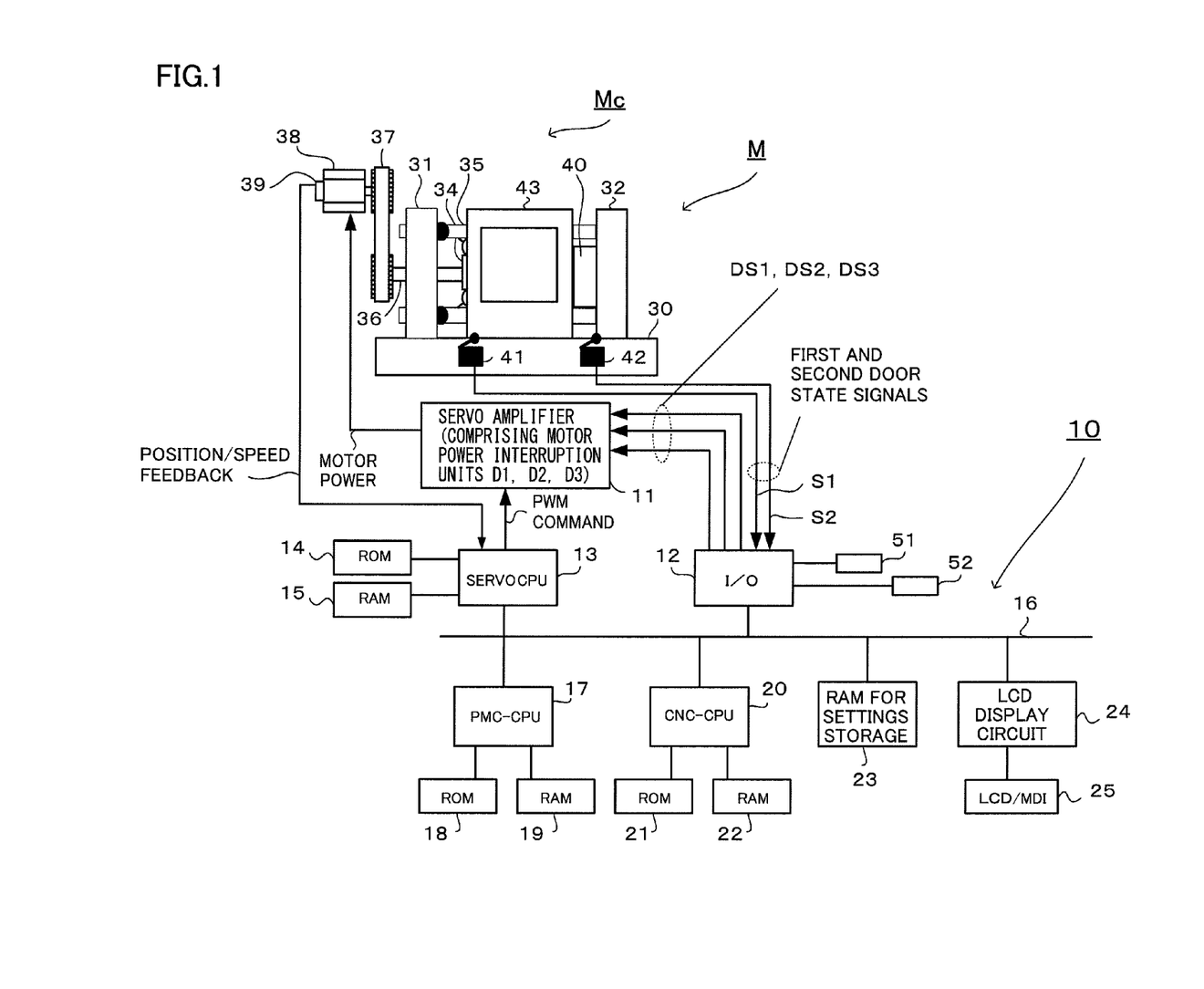
FIG. 1 is a diagram illustrating an outline of one embodiment of an injection molding machine according to the present invention.

One embodiment of an injection molding machine according to the present invention will now be described with reference to FIG. 1.

An injection molding machine M comprises a mold clamping unit $M_C$ and an injection unit (not shown). The injection unit thermally melts a resin material (pellets) and injects the resulting molten resin into a cavity of a mold 40. The mold clamping unit $M_C$ mainly serves to open and close the mold 40 and comprises a stationary platen 32, movable platen (not shown), tie-bars 35, and toggle mechanism 34. A rear platen 31 and the stationary platen 32 are coupled by a plurality of tie-bars 35, and the movable platen is guided by the tie-bars 35.

A mold opening/closing motor 38 with a position/speed detector 39 causes a power transmission mechanism 37, which is formed of a belt and the like, to rotate a ball screw 36 and moves a toggle head, which is mounted on the ball screw 36 for axial movement, axially relative to the ball screw 36, thereby extending and contracting the toggle mechanism 34.

As the toggle mechanism 34 is extended and contracted, the mold 40 is closed, opened, and clamped. These processes can be identified by detecting the rotational position of the mold opening/closing motor 38. The mold clamping unit $M_C$ and the injection unit are isolated from an operator by one or more safety doors to protect the operator.

A controller 10 of the injection molding machine M comprises a CNC-CPU 20 as a microprocessor for numerical control, a PMC-CPU 17 as a microprocessor for a programmable machine controller, and a servo CPU 13 as a microprocessor for servo controls. Information can be transferred between these microprocessors by selecting interactive input and output through a bus 16. A ROM 14 and a RAM 15 are connected to the servo CPU 13. The ROM 14 is loaded with dedicated control programs for servo controls for processing position, speed, and current loops. The RAM 15 is used for temporary storage of data.

The mold opening/closing motor 38, which is a servomotor configured to drive a mold clamping shaft for clamping the mold 40, is connected with a servo amplifier 11 that supplies motor drive power. An output (position/speed feedback signal) from the position/speed detector 39 attached to the mold opening/closing motor 38 is fed back to the servo CPU 13. The rotational position of the mold opening/closing motor 38 is calculated by the servo CPU 13, based on the feedback signal from the position/speed detector 39, and updated and stored in a current position register. Further, the servo amplifier 11 comprises a motor power interruption circuit D.

A ROM 18 and a RAM 19 are connected to the PMC-CPU 17. The ROM 18 is a memory that stores sequential programs for controlling the sequential operation of the injection molding machine M. The RAM 19 is used for temporary storage of data and the like. Further, a ROM 21 and a RAM 22 are connected to the CNC-CPU 20. The ROM 21 is a memory that stores various programs, such as an automatic operation program for generally controlling the injection molding machine M. The RAM 22 is used for temporary storage of arithmetic data and the like. A RAM 23 for settings storage, which is composed of a nonvolatile memory, is a molding data memory that stores molding conditions and various settings related to injection molding operation, parameters, macro variables, etc.

An LCD/MDI 25 is a manual data input device with a liquid-crystal display unit and is display-controlled by an LCD display circuit 24. The LCD display circuit 24 is connected to the bus 16 through an interface (not shown) and can perform operations for function menu selection, input of various data, etc. The LCD display circuit 24 is provided with a numeral-key pad for numerical data input, various function keys, etc.

According to the above configuration, the PMC-CPU 17 controls the sequential operation of the entire injection molding machine M. The CNC-CPU 20 distributes move commands for servomotors for individual axes, based on the operation program in the ROM 21, molding conditions stored in the RAM 23 for data storage, etc., and outputs the move commands to the servo CPU. Based on the move commands from the CNC-CPU 20, the servo CPU 13 performs the servo controls, including the position-, speed-, and current-loop controls and outputs a PWM command to the servo amplifier 11. In response to the PWM command from the servo CPU, the servo amplifier 11 supplies electric power as motor power to the mold opening/closing motor 38.

The injection molding machine M is furnished with two switches for detecting the open/close state of a safety door 43, that is, a first state detection switch 41, for use as a first safety-door state detection unit, and a second state detection switch 42, for use as a second safety-door state detection unit. The switches attached to the injection molding machine M are not limited to two in number. First and second safety-door state signals S1 and S2 output from the first and second state detection switches 41 and 42, respectively, are individually input to the controller 10 of the injection molding machine M through an I/O unit 12.

Figure 2:
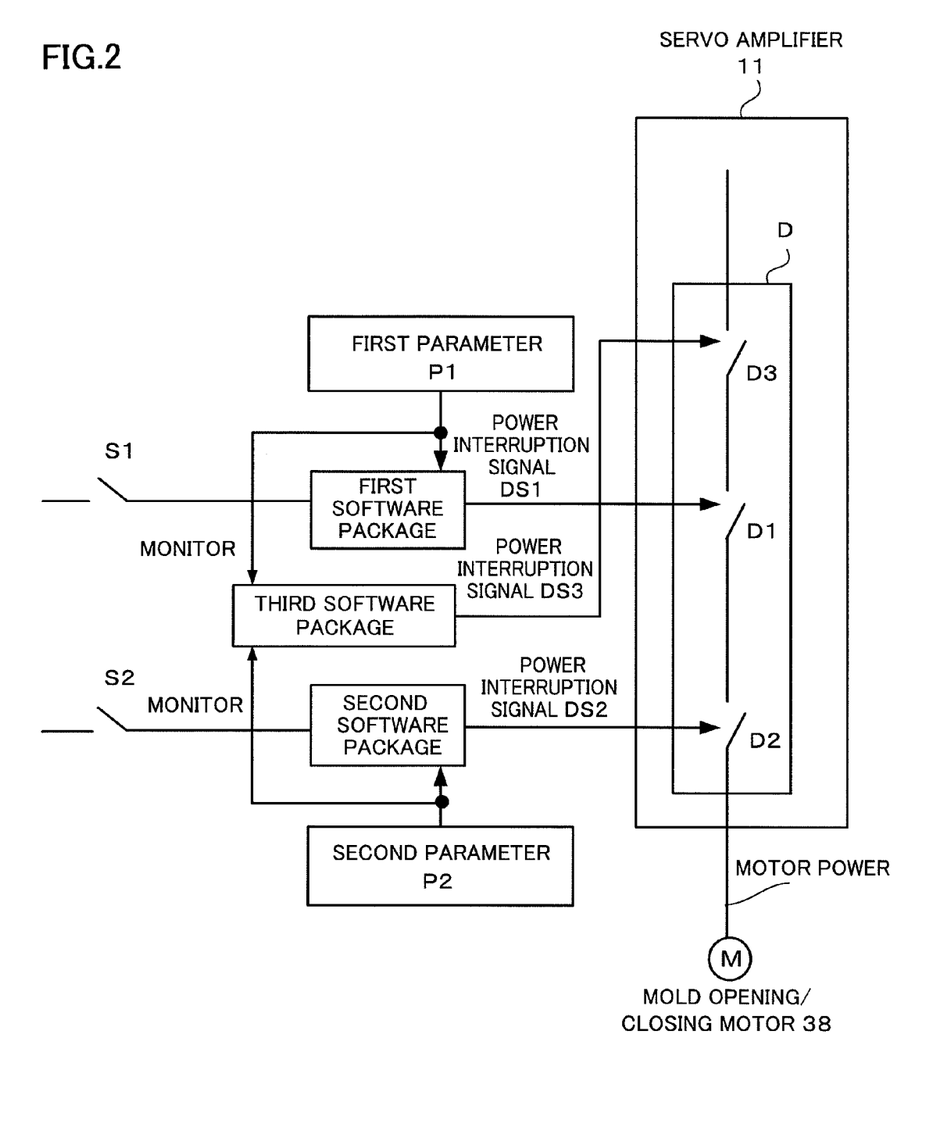
FIG. 2 is a diagram illustrating a first example of a motor power interruption circuit in a servo amplifier of the injection molding machine of FIG. 1.
Figure 3:
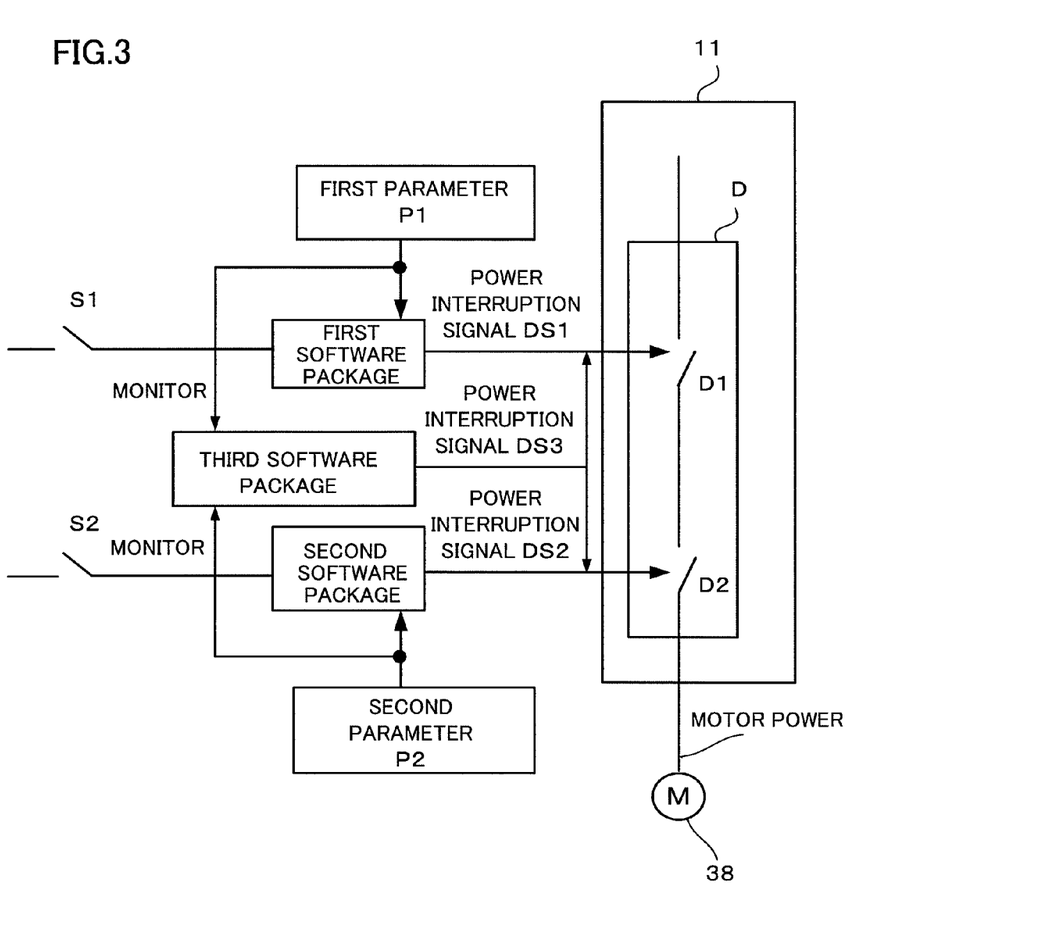
FIG. 3 is a diagram illustrating a second example of the motor power interruption circuit in the servo amplifier of the injection molding machine of FIG. 1.

As shown in FIGS. 2 and 3, a storage device in the controller 10 of the injection molding machine M is incorporated with first, second, and third software packages. These three software packages determine whether or not to interrupt power supply to the motor (mold opening/closing motor 38) based on two or more motor power interruption criteria (described later)

The following is a description of a case in which three interruption criteria are set.

Interruption criterion 1: The motor power is unconditionally interrupted if the safety door 43 is opened.

Interruption criterion 2: Although power supply to the motor is interrupted if the safety door 43 is opened, however, it exceptionally is not interrupted while both of two-hand push buttons 51 and 52 (FIG. 1) are being depressed.

Interruption criterion 3: Although power supply to the motor is interrupted if the safety door 43 is opened, however it exceptionally is not interrupted while an operation for opening the mold 40 is being performed.

Interruption criterion settings (parameters) for selecting either one of those interruption criteria 1 to 3 are set at two locations in the storage device in the controller 10 of the injection molding machine M, independently of each other, as first and second parameters P1 and P2.

A first example of the motor power interruption circuit in the servomotor of the injection molding machine will now be described with reference to FIG. 2.

The first to third software packages can be previously loaded into, for example, the ROM 18 that is connected to the PMC-CPU 17. Processing in these software packages will be described later with reference to FIGS. 4, 5 and 6.

The motor power interruption criteria that are referred to by the first and second software packages can be loaded into, for example, the RAM 23 for settings storage. The storage area for the first to third software packages is not limited to the ROM 21. The first to third software packages are independently executed in, for example, the PMC-CPU 17. These software packages are not always executed by the PMC-CPU 17 only and may alternatively be executed in dispersed manner by the CNC-CPU 20 and servo CPU 13 or by the CPUs 13, 17 and 20.

The first and second software packages refer to the first and second parameters P1 and P2, respectively. Based on the first and second parameters P1 and P2 which have individually been set, states of the first and second safety-door state detection units 41 and 42, states of the two-hand push buttons (first and second buttons 51 and 52), and the operating state of the injection molding machine M, e.g., a molding process, the first and second software packages output first and second motor power interrupt signals DS1 and DS2 to first and second motor power interruption units D1 and D2, respectively, in the motor power interruption circuit D of the servo amplifier 11.

The third software package serves to monitor whether or not the settings of the first and second parameters P1 and P2 are the same. The third software package operates independently of the first and second software packages. If different contents are wrongly set in the first and second parameters P1 and P2, the third software package outputs a third motor power interrupt signal DS3. Thereupon, a third motor power interruption unit D3 connected in series with the first and second motor power interruption units D1 and D2 is activated to interrupt power supply to the motor. The third software package, like the first and second software packages, can be previously loaded into the ROM 18.

The servo amplifier 11 comprises the motor power interruption circuit D, which comprises the first to third motor power interruption units D1 to D3. The first to third motor power interruption units D1 to D3 are on/off-controlled by the first to third software packages, respectively.

As shown in FIG. 2, the first to third motor power interruption units D1 to D3 are connected in series. If at least one of these series-connected motor power interruption units is cut off, the power supply to the motor is interrupted. The first to third motor power interruption units D1 to D3 may be series-connected in any order. Specifically, the motor power interruption units D1 to D3 may be electromagnetic relays, switching elements constituting a converter that converts direct current into alternating current for driving the motor, etc.

A second example of the motor power interruption circuit in the servomotor of the injection molding machine will now be described with reference to FIG. 3. In the example shown in FIG. 3, the first and second motor power interruption units D1 and D2 that are connected in series are not further connected with the third motor power interruption unit D3.

This example is the same as the motor power interruption circuit shown in FIG. 2 in that the third motor power interrupt signal DS3 is output by the third software package if different contents are set in the first and second parameters P1 and P2. In the example of FIG. 3, however, the output third motor power interrupt signal DS3 activates at least one of the first and second motor power interruption unit D1 and D2, thereby interrupting power supply to the motor.

Figure 5:
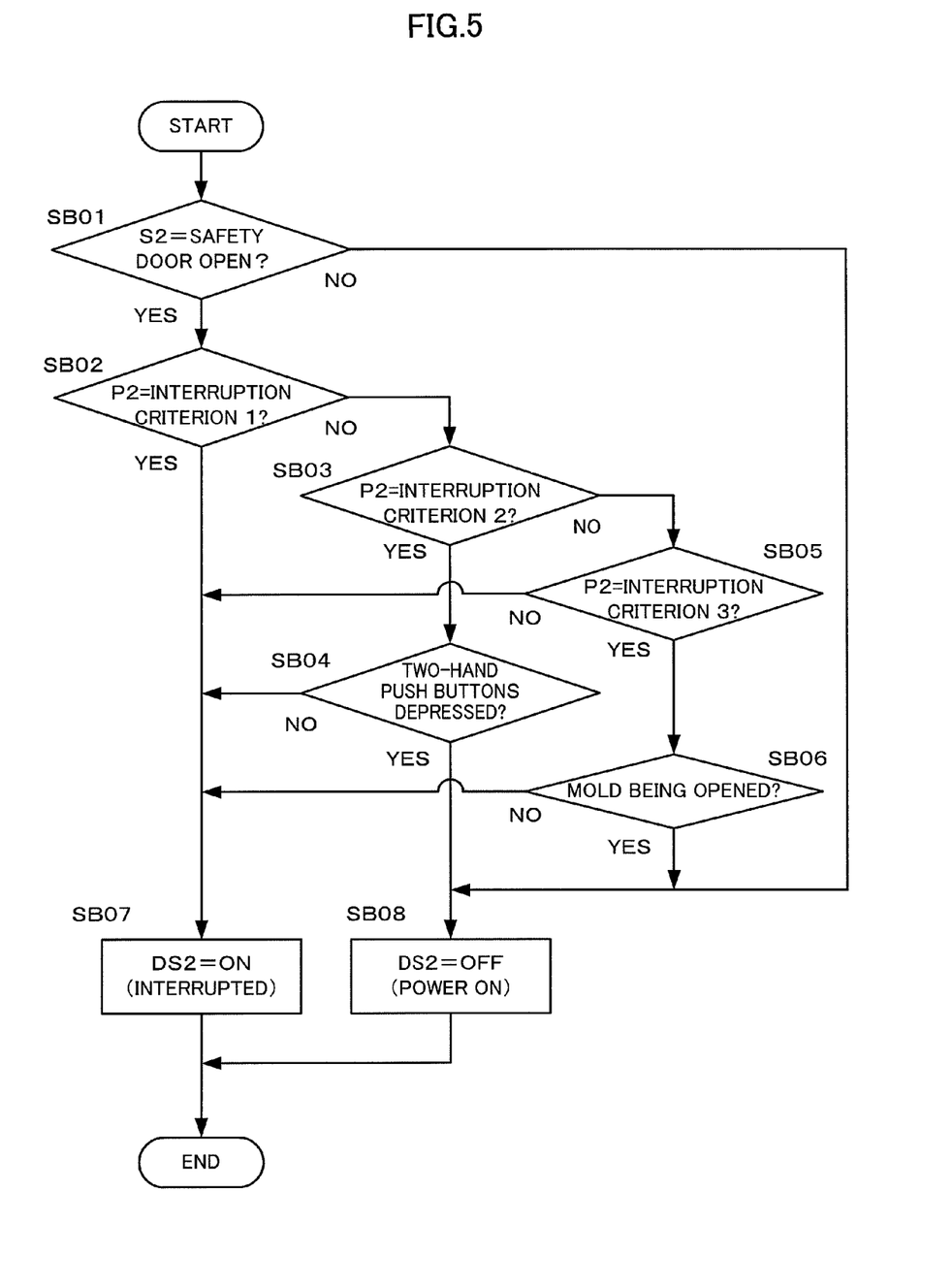
FIG. 5 is a flowchart illustrating a flow of processing in a second software package incorporated in the storage device in the controller of FIG. 1.
Figure 6:
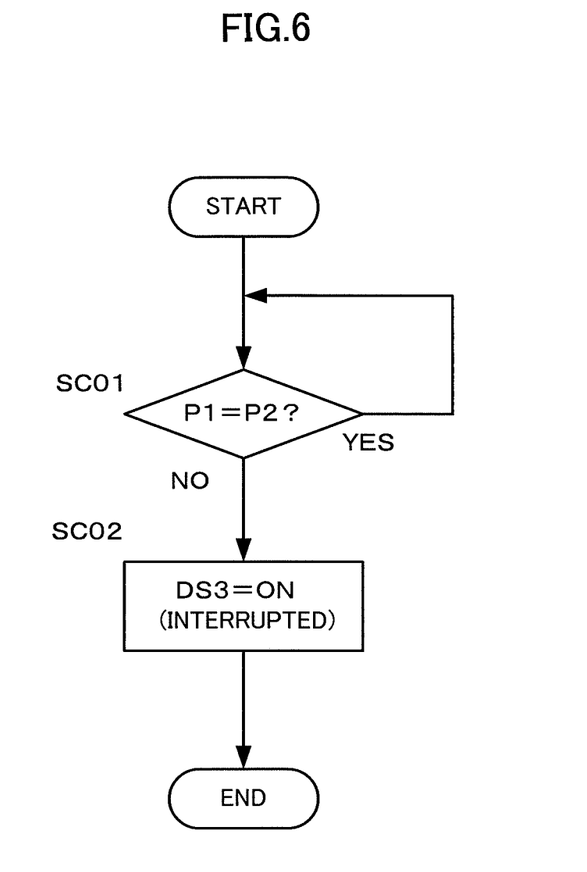
FIG. 6 is a flowchart illustrating a flow of processing in a third software package incorporated in the storage device in the controller of FIG. 1.

The processing in the first to third software packages, which are incorporated in the storage device in the controller 10 of the injection molding machine M and operate independently of one another, will now be described with reference to FIGS. 4 to 6.

First, a flow of processing in the first software package will be described with reference to the flowchart of FIG. 4. The following is a sequential description of various steps of operation.

[Step SA01] Based on a signal from the first state detection switch 41, it is determined whether or not the safety door 43 is open. If the safety door 43 is open (YES), the program proceeds to Step SA02. If not (NO), the program proceeds to Step SA08.

[Step SA02] It is determined whether or not the first parameter P1 used for executing an interruption determination is the interruption criterion 1. If the first parameter P1 is the interruption criterion 1 (YES), the program proceeds to Step SA07. If not (NO), the program proceeds to Step SA03.

[Step SA03] It is determined whether or not the first parameter P1 used for executing an interruption determination is the interruption criterion 2. If the first parameter P1 is the interruption criterion 2 (YES), the program proceeds to Step SA04. If not (NO), the program proceeds to Step SA05.

[Step SA04] It is determined whether or not two-hand push buttons 51 and 52 are depressed. If these buttons are depressed, the program proceeds to Step SA08. If not (NO), the program proceeds to Step SA07.

[Step SA05] It is determined whether or not the first parameter P1 used for executing an interruption determination is the interruption criterion 3. If the first parameter P1 is the interruption criterion 3 (YES), the program proceeds to Step SA06. If not (NO), the program proceeds to Step SA07.

[Step SA06] It is determined whether or not the injection molding machine M is in a process for opening the mold. If the injection molding machine M is in a process for opening the mold (YES), the program proceeds to Step SA08. If not (NO), the program proceeds to Step SA07.

[Step SA07] The first motor power interrupt signal DS1 is turned on, in other words, power supply to the motor is interrupted, whereupon this processing ends.

[Step SA08] The first motor power interrupt signal DS1 is turned off, in other words, power supply to the motor is turned on, whereupon this processing ends.

Then, a flow of processing in the second software package will be described with reference to the flowchart of FIG. 5. The following is a sequential description of various steps of operation.

[Step SB01] Based on a signal from the second state detection switch 42, it is determined whether or not the safety door 43 is open. If the safety door 43 is open (YES), the program proceeds to Step SB02. If not (NO), the program proceeds to Step SB08.

[Step SB02] It is determined whether or not the second parameter P2 used for executing an interruption determination is the interruption criterion 1. If the second parameter P2 is the interruption criterion 1 (YES), the program proceeds to Step SB07. If not (NO), the program proceeds to Step SB03.

[Step SB03] It is determined whether or not the second parameter P2 used for executing an interruption determination is the interruption criterion 2. If the second parameter P2 is the interruption criterion 2 (YES), the program proceeds to Step SB04. If not (NO), the program proceeds to Step SB05.

[Step SB04] It is determined whether or not two-hand push buttons 51 and 52 are depressed. If these buttons are depressed, the program proceeds to Step SB08. If not (NO), the program proceeds to Step SB07.

[Step SB05] It is determined whether or not the second parameter P2 used for executing an interruption determination is the interruption criterion 3. If the second parameter P2 is the interruption criterion 3 (YES), the program proceeds to Step SB06. If not (NO), the program proceeds to Step SB07.

[Step SB06] It is determined whether or not the injection molding machine M is in a process for opening the mold. If the injection molding machine M is in a process for opening the mold (YES), the program proceeds to Step SB08. If not (NO), the program proceeds to Step SB07.

[Step SB07] The second motor power interrupt signal DS2 is turned on, in other words, power supply to the motor is interrupted, whereupon this processing ends.

[Step SB08] The second motor power interrupt signal DS2 is turned off, in other words, the power supply to the motor is turned on, whereupon this processing ends.

Then, a flow of processing in the third software package will be described with reference to the flowchart of FIG. 6. The following is a sequential description of various steps of operation.

[Step SC01] It is determined whether or not the first parameter P1 to be referred to by the first software package is the same as the second parameter P2 to be referred to by the second software package. If the first parameter P1 is not the same as the second parameter P2 (NO), the program proceeds to Step SC02.

[Step SC02] The third motor power interrupt signal DS3 is turned on, whereupon this processing ends.

The above-described embodiment of the present invention will be supplementary described.

Figure 4:
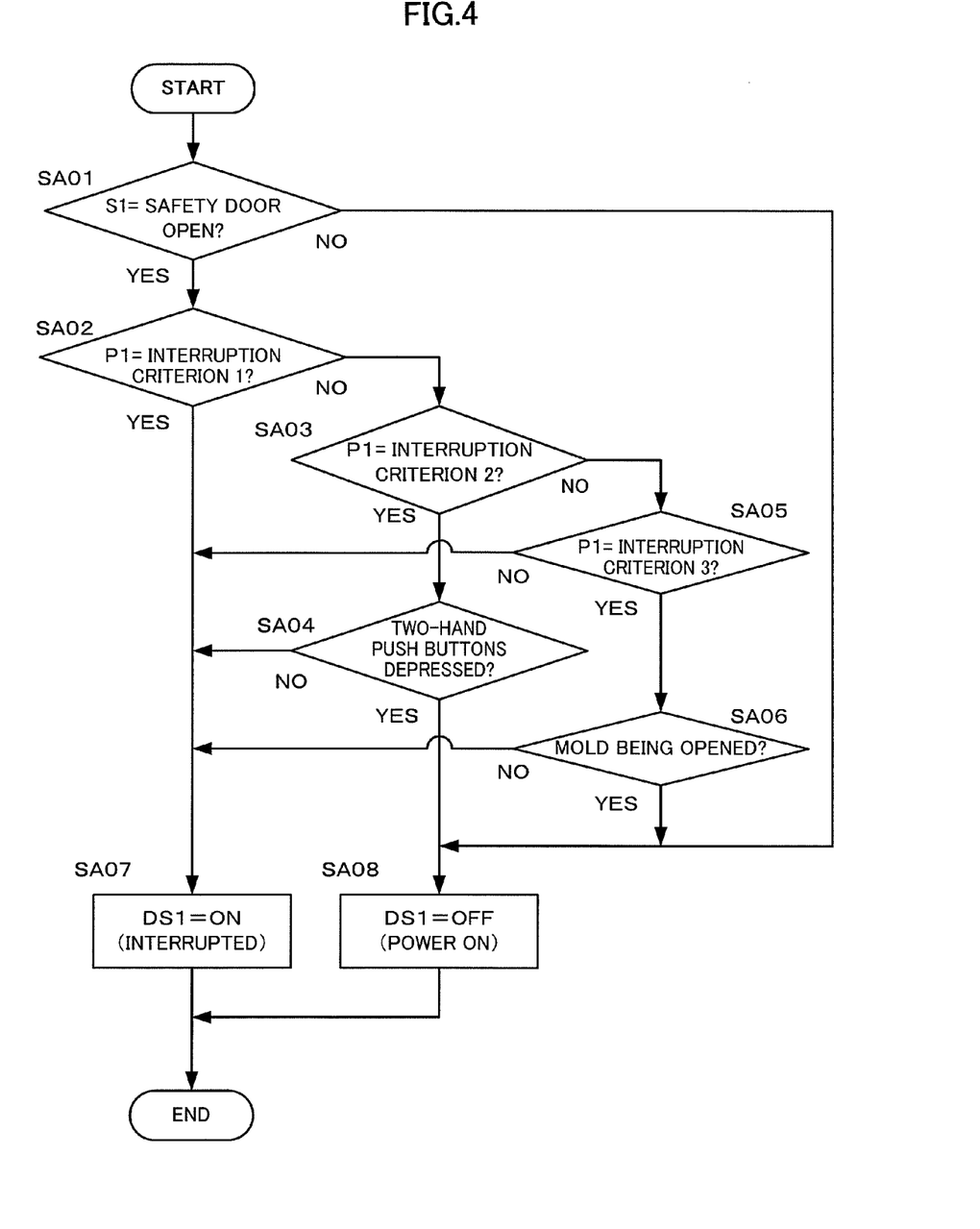
FIG. 4 is a flowchart illustrating a flow of processing in a first software package incorporated in a storage device in the controller of FIG. 1.

The processing in Steps SA04 and SA06 in the flowchart of FIG. 4 may be omitted. Likewise, the processing in Steps SB04 and SB06 in the flowchart of FIG. 5 may be omitted.

The first example (first and second motor power interruption units D1 and D2 shown in FIG. 2) and the second example (first to third motor power interruption units D1 to D3 shown in FIG. 3) of the motor power interruption circuit D are both provided in the servo amplifier 11. In the present invention, the first to third motor power interruption units D1 to D3 may be provided in any positions on a power line from a main power supply to the servo amplifier 11 to the mold opening/closing motor 38 being a servomotor, provided that power supply to the mold opening/closing motor 38 can be interrupted when at least one of those motor power interruption units D1, D2 and D3 is activated. For example, the motor power interruption units can be provided on the line for the main power supply to the servo amplifier 11, the motor power interruption circuit D in the servo amplifier 11, or the line for power supply from the servo amplifier 11 to the mold opening/closing motor 38.

The third software package may have the function of monitoring the normality of the operations of the first and second software packages, in addition to the aforementioned function of monitoring the first and second parameters. Preferably, moreover, the first and second parameters P1 and P2 should be set as bit patterns each comprising a plurality of bits, not as simple digits, and have an exclusive-OR relationship. In the determination as to whether or not the first parameter P1 is the same as the second parameter P2 by using the third software package, furthermore, it is desirable to perform a logical operation on these settings to determine whether or not the value of the first parameter P1 is the same as the value of the second parameter P2. In this way, a failure of the memory in which the parameters are set and stored can be detected to improve reliability. Although the interruption criterion settings have been described herein as parameters, they may alternatively be based on hardware switches. As in the case of the parameters, first and second hardware switches may be provided such that their respective settings are referred to by the first and second software packages and whether or not the settings are identical with one another may be monitored by the third software package.

The invention claimed is:

1. An injection molding machine with motor power interruption function, in which said injection molding machine has at least two motor power interruption units which drive a moving part of the injection molding machine by means of a motor and are configured to switch between power supply to the motor and interruption of power supply to the motor according to an open/close state of a safety door, said injection molding machine comprising:

a first safety-door state detection unit configured to detect the open/close state of the safety door;

a first determination unit configured to determine whether or not to interrupt power supply to the motor, based on a first safety-door state signal output from the first safety-door state detection unit, an operating state of the injection molding machine, and a first interruption criterion setting previously set in the injection molding machine, and to output a first motor power interrupt signal;

a first motor power interruption unit configured to interrupt power supply to the motor in response to the first motor power interrupt signal output from the first determination unit;

a second safety-door state detection unit configured to detect the open/close state of the safety door;

a second determination unit configured to determine whether or not to interrupt power supply to the motor, based on a second safety-door state signal output from the second safety-door state detection unit, the operating state of the injection molding machine, and a second interruption criterion setting previously set in the injection molding machine, and to output a second motor power interrupt signal;

a second motor power interruption unit connected in series with the first motor power interruption unit and configured to interrupt power supply to the motor in response to the second motor power interrupt signal output from the second determination unit; and a third determination unit configured to determine whether or not the respective contents of the first and second interruption criterion settings are different from each other and output a third motor power interrupt signal if the contents of the two settings are different, wherein one of the at least two motor power interruption units is interrupted by the third motor power interrupt signal output by the third determination unit, thereby interrupting power supply to the motor.

2. The injection molding machine with motor power interruption function according to claim 1, further comprising a third motor power interruption unit which interrupts power supply to the motor by applying at least one of the first and second motor power interrupt signals to the third motor power interruption unit, regardless of determination results of the first and second determination units regarding power supply to the motor.

3. An injection molding machine with motor power interruption function, in which said injection molding machine has at least two motor power interruption units which drive a moving part of the injection molding machine by means of a motor and are configured to switch between power supply to the motor and interruption of power supply to the motor according to an open/close state of a safety door, said injection molding machine comprising:

a first safety-door state detection unit configured to detect the open/close state of the safety door;

a first determination unit configured to determine whether or not to interrupt power supply to the motor, based on a first safety-door state signal output from the first safety-door state detection unit, an operating state of the injection molding machine, and a first interruption criterion setting previously set in the injection molding machine, and to output a first motor power interrupt signal;

a first motor power interruption unit configured to interrupt power supply to the motor in response to the first motor power interrupt signal output from the first determination unit;

a second safety-door state detection unit configured to detect the open/close state of the safety door;

a second determination unit configured to determine whether or not to interrupt power supply to the motor, based on a second safety-door state signal output from the second safety-door state detection unit, the operating state of the injection molding machine, and a second interruption criterion setting previously set in the injection molding machine, and to output a second motor power interrupt signal;

a second motor power interruption unit connected in series with the first motor power interruption unit and configured to interrupt power supply to the motor in response to the second motor power interrupt signal output from the second determination unit;

a third determination unit configured to determine whether or not the respective contents of the first and second interruption criterion settings are different from each other and output a third motor power interrupt signal if the contents of the two settings are different; and a third motor power interruption unit which is connected in series with the first and second motor power interruption units and which interrupts power supply to the motor by applying the third motor power interrupt signal output by the third determination unit to the third motor power interruption unit.

* * * * *